Nov. 9, 1948.  L. D. STATHAM  2,453,550
BAR TYPE HIGH RANGE GAUGE
Filed July 14, 1947
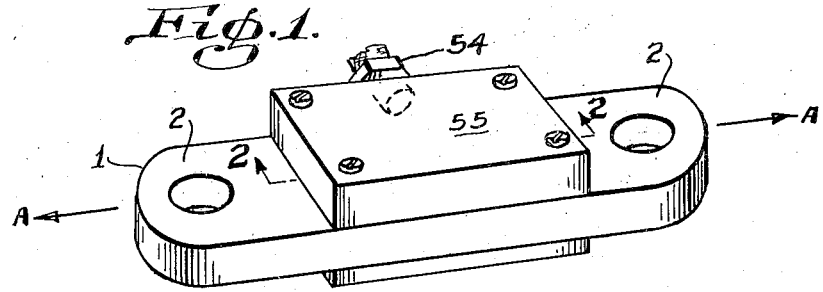
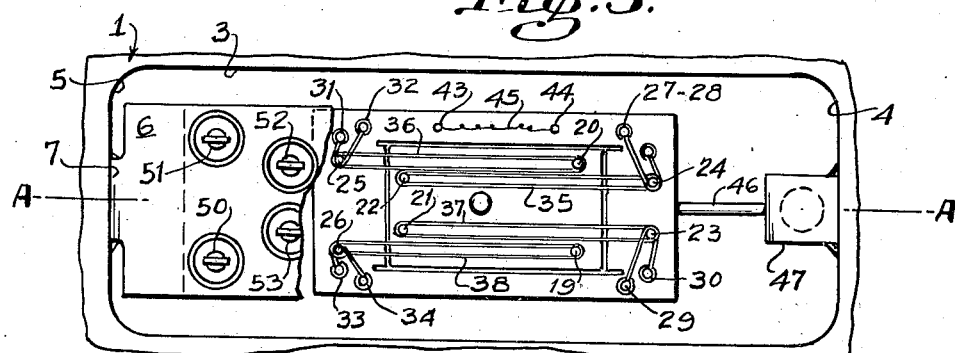
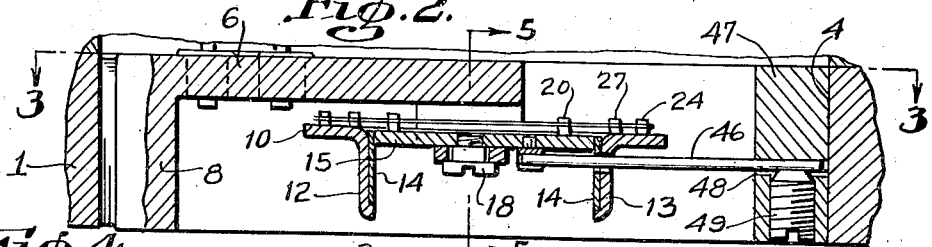
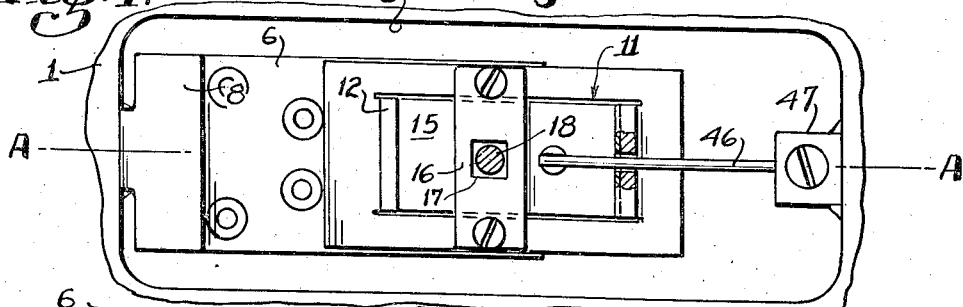
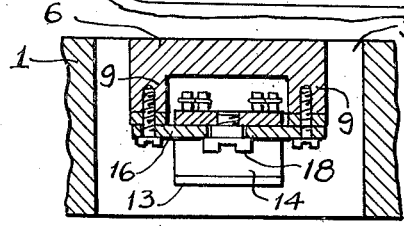
INVENTOR.
Louis D. Statham
BY
ATTORNEY.

Patented Nov. 9, 1948

2,453,550

UNITED STATES PATENT OFFICE 2,453,550

BAR TYPE-HIGH RANGE GAUGE

Louis D. Statham, Beverly Hills, Calif., assignor to Statham Laboratories, Inc., Los Angeles, Calif., a corporation of California Application July 14, 1947, Serial No. 760,771

2 Claims. (Cl. 201—63)

This invention relates to a draw bar dynamometer employing electrical resistance wire strain gauges.

It is an object of my invention to devise a draw bar dynamometer which is sensitive and responsive to strains of low value and is linear in operation. As is now well known, strain wire dynamometers of the so-called unbounded type act through the change in dimensions of an electrical strain wire mounted on two points of support which are separated or moved closer together upon the application of a force to be measured.

The sensitivity of the gauge can be increased if the gauge is mounted in a structure which acts as a dynamometer so that the force to be measured is applied to the structure to cause a separation or approach of two points between which the gauge is mounted in such relationship that the force applied to the aforementioned points is transmitted to the wire supports but in which the distance separating the aforementioned points is greater than the distance separating the wire supports. Such a method of mounting results in a strain amplification such that the strain in the wire is made greater than the strain in the structure upon which the wire gauge is mounted. I have found in applying this principle that in order to obtain linearity of the gauge and to assure its sensitivity, it is desirable in addition to the above method of mounting to also mount the wire so that it is parallel to the line of application of the force.

Other objects of my invention will appear more clearly from the description of my invention taken together with the drawing, in which Fig. 1 is a perspective view of my draw bar dynamometer;

Fig. 2 is a section taken along the line 2—2 of Fig. 1 but showing the cover removed from the draw bar;

Fig. 3 is a view taken along the line 3—3 of Fig. 2;

Fig. 4 is a bottom view of Fig. 2; and

Fig. 5 is a section taken along 5—5 of Fig. 2.

The draw bar dynamometer consists of a bar 1 in which are positioned two bores 2, one at each end. The central portion of the bar is cut out into a rectangular opening 3 having end walls 4 and 5. Upon wall 5 is attached an L-shaped bracket 6 by means of shoulder 7 by welding, soldering, or otherwise affixing the shoulder 7 to the wall 5. The bracket 6 has a top leg 8 and carries to depending flange portions 9. Upon the ends of these flange portions is mounted a rectangular frame 10 having a rectangular opening 11 and depending flanges 12 and 13. Mounted upon springs 14 which are attached to the ends of the flanges 12 and 13 is an armature 15 slidably positioned within the rectangular opening 11. A stop plate 16 is mounted on the underneath side of the frame 10 and carries a square opening 17 through which is passed a pin 18. The pin 18 is positioned in the armature 15 and acts as a limit motion stop for the movement of the armature.

Upon the top face of the armature and at one end thereof are positioned two pins 19 and 20, and at the other end of the armature and intermediate the pins 19 and 20 are two pins 21 and 22. Positioned upon the contiguous face of the frame are two pins 23 and 24 in line with pins 21 and 22, and two pins 25 and 26 in line with pins 19 and 20. These pins 19 to 26, inclusive, have an insulating surface as, for example, they may be anodized aluminum pins. Mounted in the same face of the frame are four pairs of terminal pins, 27, 28, 29, 30, 31, 32, 33, and 34. The pins 27 to 34, inclusive are mounted in insulating bushings to insulate the pins from the frame.

Wound between pins 22 and 24 is a loop of resistance strain wire 35 and similarly wound between pins 20 and 25 is a loop of strain wire 36, and wound between pins 21 and 23 is a loop of strain wire 37, and wound between pins 19 and 26 is a loop of strain wire 38. The wires of said loops are each insulated from their respective pins because of the anodized surface of the pins, and the several strands of the loops are separated from each other to form a continuous resistance strain wire. These loops are wound under tension so that the wires are stressed. The ends of the loops 35 are connected to the terminal pins 27 and 28, the ends of 36 are connected to the terminal pins 31 and 32, and the ends of 37 are connected to terminal pins 29 and 30, and the ends of 38 are connected to the terminal pins 33 and 34. Also positioned in the frame are two terminal pins 40 and 41 similar to pins 27 to 34, etc., and two pins 43 and 44 similar to pins 19 to 22. Wire 45 is strung between pins 43 and 44.

The armature 15 is connected to the draw bar by a rod 46 which is connected to the end 4 of the opening 3 by means of a block 47 in which a bore 48 is disposed. The pin 46 is fitted into the bore 48 and locked in place by set screw 49. The block 47 is welded or soldered or otherwise affixed to the end 4 in such manner that the axis of the rod 46 passes through the pin 17 and centrally of the shoulder 7, and said axis passes through each of the bores 2. As will be noted the several strands of the loop of resistance wires are parallel to this axis. The bracket 6 carries four terminals 50, 51, 52, and 53 which are suitably insulated from the bracket and are each connected to a cable which passes through a cable opening 54 in the cover 55 of the gauge.

The several terminals are connected in the following manner:

They are connected in a form of a Wheatstone bridge with wire 45 as the balancing resistance. Terminals 29 and 34 are connected to the terminals 50; terminals 30 and 31 to terminals 51; terminals 32 and 43 to terminal 52; terminal 44 to terminal 27; terminals 28 and 33 to terminal 53; and the terminals 50 to 52, inclusive may be connected in a conventional Wheatstone bridge arrangement.

Upon the application of a force to the draw bar by connecting the draw bar at the bore 2 to the force which puts the draw bar in tension or compression, the resulting stress causes a change in length of the draw bar between the center of the bore 2. This change in length divided by the distance between the center of the bore 2 is by definition the strain imposed upon the draw bar. Because of the coaxial arrangement of the rod 46 and the point of attachment of the bracket 6 at 7, and the in-line position of the central pin 18 and the parallel arrangement of the wires with respect to the axis of 46 a proportional separation or approach of the pins 20, 25, 19, and 26 occurs, and an equal reduction in length between the pins 21, 23, 22, and 24. The increase in strain on the wires 38 and the decrease in strain in the wires 37 bear the same ratio to the strain in the draw bar as the distance between said pins bears to the distance between the center of the bore 2. The wire gauge is thus subjected to strain which is greater than the strain on the bar by reason of this multiplication factor. The change in strain will be directly proportional to the strain imposed on the draw bar throughout the limits of action and the multiplication factor remains substantially constant throughout such action; in other words, the gauge is linear in character.

While I have described a particular embodiment of my invention for the purpose of illustration, it should be understood that various modifications and adaptations thereof may be made within the spirit of the invention as set forth in the appended claims.

I claim:

1. A draw bar electrical strain gauge dynamometer, comprising a bar, an opening in said bar intermediate the ends of said bar, a frame mounted intermediate the ends of said opening, an armature reciprocably mounted in said frame, a rod connecting said armature and one end of said opening, an electrical strain wire support mounted on said frame, an electrical strain wire support mounted on said armature, and an electrical resistance strain wire mechanically mounted on said support and insulated therefrom and extending parallel to said rod.

2. A draw bar electrical strain gauge dynamometer, comprising a bar, a rectangular opening in said bar, a bracket mounted on one end of said opening and extending longitudinally of said opening, an electrical strain gauge dynamometer frame mounted on said bracket at a point spaced from the ends of said opening, an armature reciprocably positioned in said frame, a rod attached to said armature and to the other end of said opening, a strain wire support on one end of said frame, a strain wire support on the opposite end of said armature, and an electrical strain wire mechanically mounted on said supports and insulated therefrom, said wire extending parallel to the axis of said rod.

LOUIS D. STATHAM.

No references cited.